May 3, 1966   P. VAN ZONNEVELD   3,249,417
APPARATUS FOR MELTING GLASS WITH CHARGING MEANS
Filed July 1, 1960   2 Sheets-Sheet 1

INVENTOR
Pieter van Zonneveld.

BY
Frank R. Trifari
AGENT

May 3, 1966    P. VAN ZONNEVELD    3,249,417
APPARATUS FOR MELTING GLASS WITH CHARGING MEANS
Filed July 1, 1960    2 Sheets-Sheet 2

INVENTOR
*Pieter van Zonneveld.*
BY
*Frank R. Trifari*
AGENT

United States Patent Office 3,249,417
Patented May 3, 1966

3,249,417
APPARATUS FOR MELTING GLASS WITH CHARGING MEANS
Pieter van Zonneveld, Eindhoven, Netherlands, assignor to North American Philips Company, Inc., New York, N.Y., a corporation of Delaware
Filed July 1, 1960, Ser. No. 40,248
Claims priority, application Netherlands, July 7, 1959, 241,014
5 Claims. (Cl. 65—335)

A method and apparatus for manufacturing clear tube material or rod material consisting of quartz, quartz glass or other glasses having a high content of $SiO_2$, is known in which use is made of a melting oven comprising means for heating the melt and having an outlet aperture for the molten material provided in its base.

In the known apparatus, the raw materials for the melt are supplied and melted at the upper side of an electrically heated oven, frequently having the shape of a shaft. The molten glass leaves the oven at its lower side in the form of glass tube or glass rod.

When using the known method, "stripes" occur in the product drawn, which stripes (channels filled with gas) are objectionable to the quality of the product drawn.

An object of the present invention is to mitigate this defect.

The method and apparatus according to the invention comprises an oven having an outlet aperture for the molten material provided in its base, and is characterized in that the heat is supplied to the melt, at least substantially, by means of a burner arranged in the oven above the surface of the melt, and the raw materials for the melt are fed in a thin layer onto the surface of the melt and onto the hottest portion thereof. As a result of the use of a thin layer, occlusions of gas do not occur in this layer upon its being melted together with the melt. In this new method, occlusions of gas in the product drawn is avoided by means of a proper control of the manner in which the raw materials brought are fed into the oven above the melt to be fused together with this melt. It has been found that when these raw materials, which may consist, for example, of fragments of clear quartz crystal, are brought onto the upper surface of the melt in a more or less thick layer, the amount of gas present in this layer between the fragments of quartz crystal finds its way into the melt when the layer is fused. The occlusions of gas then occur in the melt as gas bubbles and can hardly escape therefrom on account of the high viscosities in the glass bath. Consequently, such occlusions appear in the ultimate product drawn as visible stripes which are frequently found to consist of channels filled with gas. By using a thin layer of raw materials in the method and apparatus according to the invention, and at the same time supplying this thin layer to the hottest portion of the melt, substantially no occlusions of gas between the fragments of raw material constituting the layer is achieved or any occlusions of gas present can readily escape. It is thus possible for this layer to be so fused together with the melt that occlusions of gas do not, or substantially do not occur and find their way into the melt.

In order to completely avoid the drawback of occlusions of gas, another embodiment of the method according to the invention, the raw materials for the melt are brought onto the surface of the melt in a single layer.

In a further embodiment of the method according to the invention, the raw materials for the melt are brought onto the surface of the melt at least substantially directly above the outlet aperture of the oven. The advantage thus obtained is that the glass mass present in areas outside the feed zone will not flow. This applies more particularly to those portions of the glass which are located near the inner wall of the glass tank. Consequently, on the one hand, the walls of the glass tank are less subject to wear and, on the other hand, the glass present near the walls of the glass tank, owing to its lower temperature with respect to the glass in the more central portion of the glass bath, substantially does not emerge through the outlet aperture provided in the base of the oven.

The present invention also provides an oven for carrying out the method described hereinbefore. Such an oven comprises an outlet for the molten material, which is provided with a heating device, and means for supplying raw materials to the oven. The oven is characterized in that one of its vertical side walls has an aperture in which a burner is positioned so that the flame emerging from it is directed at least substantially horizontally and lies at a small distance above the surface of the melt present in the oven.

The oven may be a simple structure because of the kind of the melting process to be used therewith. In one embodiment thereof, the positioning of the apertures in the side walls is such that that vertical side wall of the oven which faces the opening of the burner is provided with an aperture for discharging the flue gases. In order to limit the number of the apertures in the side walls of the oven, the raw materials may be supplied to the surface of the melt through the flue. In this case, the supply of raw materials and the discharge of flue gases may be carried out intermittently in a manner such that during the supply of raw materials, which takes up a comparatively short time, the flame stroking over the glass bath is interrupted for several moments.

Because of the high melting temperatures for melting, for example, quartz glass, high requirements must be imposed upon the refractory material of, for example, the tank and the hood of the oven. For this purpose use may be made of refractory material of zirconium oxide.

The invention also provides a device for the supply of the raw materials to the surface of the melt present in the oven. This device is of a design such that it permits a thin and preferably single layer of raw materials to be supplied to the upper surface of the melt. In one embodiment thereof, the device comprises a carrier and a removable covering plate. A thin layer of raw materials may be deposited on this carrier outside the melt chamber. When the carrier, after having been turned over 180° about its longitudinal axis, has been placed in the oven and above the surface of the melt, the raw materials may be disposed on the glass bath by subsequent removal of the covering plate from the carrier.

In cases where, in addition to the requirement of a thin and single layer of raw materials, it is also necessary to fulfill the condition that, for example, the fragments which may constitute the raw materials must not contact with one another in the horizontal plane on the melt, use may be made of a carrier divided into a number of partitions. It is possible for fragments of raw material to be disposed in such partitions in a specific pattern so that, after the covering plate of the carrier has been removed above the surface of the glass bath, the fragments of raw material and deposited on the surface of the glass bath separated from one another.

In order that the invention may be readily carried into effect, one embodiment thereof will now be described in detail, by way of example, with reference to the accompanying diagrammatic drawing, in which.

In the manufacture of clear tube material or rod material consisting of quartz, quartz glass or other glasses having a high content of $SiO_2$, use is generally made of fragments of raw material such, for example, as clear quartz crystal. When such quartz crystal, which is clear in itself, is melted in an oven, it may be formed into very clear quartz glass. The initial material used could alternatively consist of powder sintered into fragments.

Figure 1:
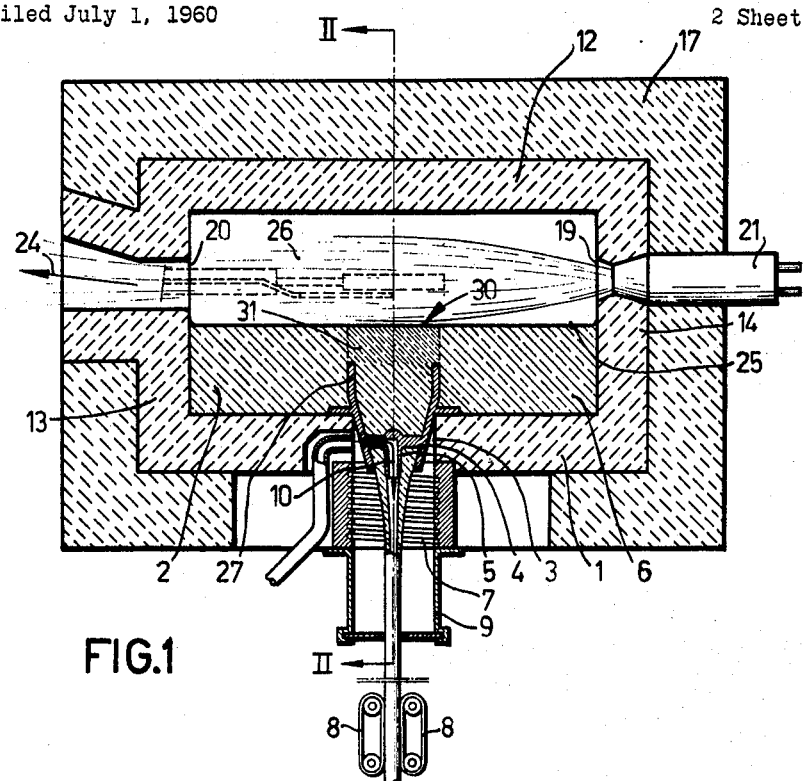
FIGURE 1 is a cross-sectional view of an oven according to the invention.
Figure 2:
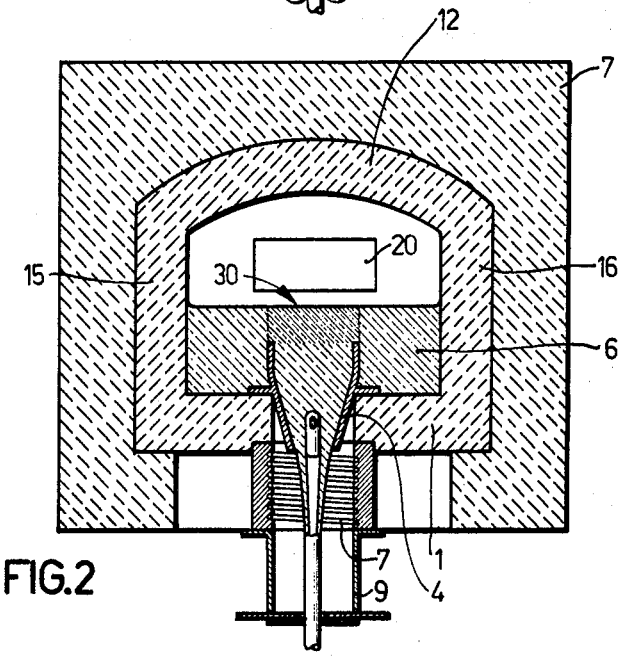
FIGURE 2 is a sectional view taken along the line II—II of FIGURE 1.

FIGURES 1 and 2 show inter alia the oven portion of a device for vertical drawing of glass rods or tubes. A base 1 of the oven is provided with an aperture 3 which accommodates a so-called drawing cone 4 having a mandrel 5. An amount of molten glass 6 present in the oven can emerge as a glass blank through the drawing cone 4. The figures also show diagrammatically means used for continuously drawing tubes or rods from this glass blank, comprising a heating coil and the drawing chains of a drawing machine 8. Since the drawing cone 4 comprises portions of molybdenum and the heating coil 7 is made of tungsten, it is necessary to prevent these parts from contacting with the atmosphere. For this purpose, provision is made of a protective body 9 in which a non-oxidizing atmosphere is maintained with the aid of a non-oxidizing gas. If tubes are drawn, it is also common practice to maintain a non-oxidizing atmosphere inside this tube by means of, for example, non-oxidizing gas supplied in the direction indicated by arrow 10.

The oven portion in which the raw materials are melted comprises a base 1, a hood 12, vertical side walls 13 and 14 between the base and the hood and an insulating layer 17 as shown. On account of the high melting temperatures, on the order of 2150° C., which occur in an oven for melting, quartz glass, a refractory material containing zirconium oxide may be used. The side walls of the oven are provided with two apertures 19 and 20 respectively which face each other in this embodiment, the extremity of a gas-oxygen burner 21 being placed in the aperture 19, and the aperture 20 being provided in the opposite side wall so as to be directly opposite the aperture 19. As can be seen from the figures, a flame 26 of the burner is adjusted so that it is directed substantially horizontally and at a short distance above a surface 25 of the glass bath 6, so that it supplies heat to the melt without disturbing it and can leave the oven directly through the aperture 20 in the direction indicated by arrow 24.

Assuming that the oven, filled with an amount of molten glass 6 as illustrated, is supplied with raw materials so that they build up or pile on the surface 25. It will be evident that an amount of gas is present between the fragments constituting this layer. When the layer is melted, these gases occur as occlusions in the melt after the raw materials fuse together with the melt. On account of the high viscosities in the glass bath which occur in melting quartz glass, such occlusions of gas can hardly escape. Consequently, they appear in the ultimate tube material or rod material drawn as stripes which are serious defects of quality for a clear product.

To avoid such stripes, according to the invention, these occlusions of gas in the melt are avoided by supplying the heat to the melt by means of a burner 21 and providing the raw materials for the melt on the hottest portion of the surface 25 or single layer of contacting or separated particles in the form of a thin layer. The flame of the burner is preferably adjusted so that the hottest area lies directly above the outlet aperture. By depositing the raw material in a thin layer on the hottest area of the melt, the fragments of raw material, in contact with the surface 25 of the melt, adhere to this surface at their underside or float on said surface without occlusions of gas and the fragments of raw material present at the upper side of the layer (protruding from the melt) are directly melted by the flame. It has been found that, by proceeding in this way, occlusions of gas are materially reduced.

Depositing the raw materials in a single layer of separated particles on the surface 25 of the glass bath 6 occlusions of gas in the melt may be avoided completely.

As can be seen from FIGURE 1, the cone 4 has an annular portion indicated by 27. Thus it is ensured, that any zirconium silicates accumulating on the base 1 as a reaction product of the zirconium oxide refractory material produced by wear and the glass bath is prevented from flowing through the aperture in the base of the oven, and, since the raw materials are deposited onto the hottest area of the glass bath at 30, only the portion 31 of the glass bath 6 is used for working into rods or tubes.

In order to restrict the number of apertures in the vertical side walls of the oven, the raw materials may be supplied to the surface 25 of the melt by use of the same aperture through which the flue gases are discharged. It will be evident that the supply of raw materials and the discharge of flue gases must be effected intermittently in a manner such that during the supply of the raw materials, which takes up a comparatively short time, the flame 26 must be interrupted for some moments.

Figure 3:
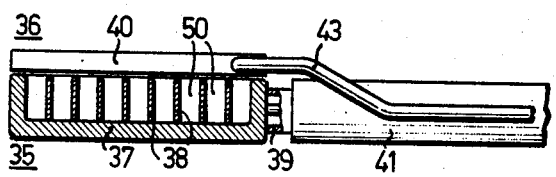
FIGURES 3 and 4 are a side view and a plan view, respectively, of a portion of the means for the supply of raw materials to the melt present in the oven.
Figure 4:
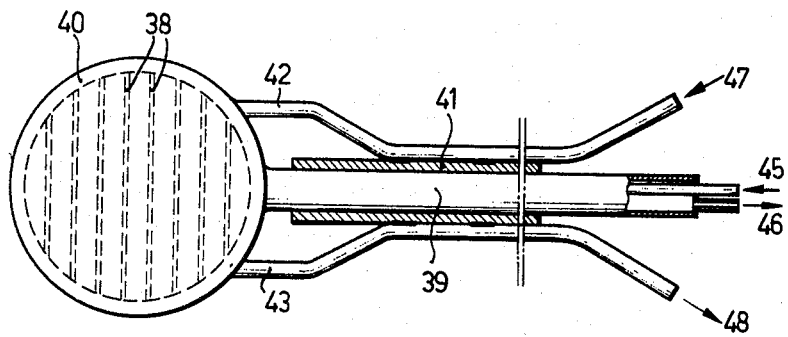

The means for supplying the raw materials to the melt are illustrated, in one embodiment, in FIGURES 3 and 4. It comprises a water-cooled carrier of flat shape constituted by parts 35 and 36 which can move with respect to each other. The part 35 comprises a water-cooled carrier 37 having provided on it a plurality of partition walls 38 and a pipe 39 welded to carrier 37. The part 36 comprises a water-cooled covering plate 40, a sleeve 41 and two tubes 42 and 43 welded to the covering plate 40 and to sleeve 41 respectively. The arrangement is such that pipe 39 can slide within sleeve 41 and hence the covering plate 40 is movable with respect to the carrier 37. Connections to cooling water are indicated by arrows 45 and 46 for the part 35 and by arrows 47 and 48 for the part 36.

Working with this carrier may be effected as follows: After the parts 36 and 35 have been separated from each other, fragments of raw material are disposed in spaces 50 of the part 35. Subsequently, the parts 35 and 36 are again moved together to occupy the position shown in FIGURE 3, the composite carrier is then turned by 180° about its longitudinal axis so that that part 36 comes to lie below and the part 35. Consequently, the fragments of raw material come to lie, as it were, on the covering plate 36. Next, the whole of the carrier is passed through flue and aperture 20 directly above the outlet or cone 4 and above the surface 25 of the glass bath and the parts 35 and 36 are moved apart. The part 35 being maintained in position and the part 36 being moved as indicated by the dotted lines in FIGURE 1. During this manipulation, the fragments of raw material fall out of the carrier onto the glass bath and come to lie, regularly distributed over the portion 30, in contact with the surface 25 of the glass bath 6. The whole of the carrier is now removed from the oven and may again be provided with raw materials.

Figure 5:
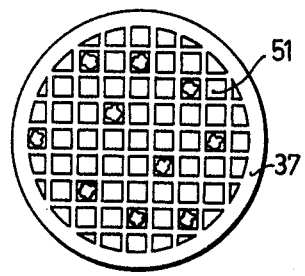
FIGURE 5 illustrates one arrangement of the raw materials on the carrier of FIGURES 3 and 4.

In cases where, in addition to the requirement of a thin and preferably single layer of raw materials, it is also necessary to fulfill the condition that the fragments of raw material brought onto the surface of the melt must not contact one another in the horizontal plane. In one particular embodiment shown in FIGURE 5 use may be made of a carrier whose partition walls form a plurality of more or less square partitions 51. A fragment of raw material may be disposed in each of these partitions or in a pattern as shown in FIGURE 5.

What is claimed is:

1. Apparatus for melting glass including a melting chamber a heating device and means for charging said furnace; the combination comprising a melting chamber having an opening in one side wall adapted to receive burner means, an opening in the opposite side wall adapted to exhaust gases from said chamber and receive a charging means introduced into said chamber, said charging means comprising a carrier divided into a number of partitions, a removable cover plate operatively associated with said carrier, a plurality of discrete compartments for charging material confined between said carrier and cover, and means adapted to move said cover plate transversely with respect to said carrier for discharging charging material therefrom, the partitions of said carrier and relation between said cover and carrier being such that the charging material deposited in said chamber defines a single layer of adjacent particles.

2. Apparatus for melting glass comprising means defining a melting chamber for supporting a molten pool of glass, said chamber having only a first aperture defining means for discharging melt from said chamber, a second aperture defining means adapted to receive burner means, and a third aperture means substantially directly opposite said second aperture means for discharging flue gases from said chamber and for receiving carrier means for charging said chamber.

3. Apparatus for melting glass comprising means defining a melting chamber for supporting a molten pool of glass, said chamber having only an aperature defining means for discharging melt from said chamber, a second aperture defining means adapted to receive burner means, a third aperture means substantially directly opposite said burner means for discharging flue gases from said chamber and for receiving a charging means for feeding raw material to said furnace said burner means being disposed in a plane relative to the surface of said pool such that the flames brush said surface.

4. Apparatus according to claim 3 wherein said charging means comprises a shallow carrier member, a cover member and means to removably secure said cover member in operative relation with said carrier member.

5. Apparatus according to claim 4 wherein said charging means comprises a compartmented carrier member for receiving and maintaining raw material particles in spaced relation.

References Cited by the Examiner

UNITED STATES PATENTS

| | | | |
|---|---|---|---|
| 790,332 | 5/1905 | Turner | 214—26 |
| 989,445 | 4/1911 | Thomas et al. | 214—26 |
| 1,870,636 | 8/1932 | McIntyre et al. | 65—158 |
| 1,992,994 | 3/1935 | Delpech | 65—66 |
| 2,006,947 | 7/1935 | Ferguson | 65—335 X |
| 2,155,131 | 4/1939 | Hanlein | 65—157 |
| 2,281,050 | 4/1942 | Redshaw | 65—335 X |
| 2,904,713 | 9/1959 | Heraeus et al. | 65—134 X |
| 2,958,161 | 11/1960 | Palmer | 263—52 |

FOREIGN PATENTS

| | | |
|---|---|---|
| 25,429 of 1935 | 11/1936 | Australia. |
| 486,447 | 11/1929 | Germany. |
| 526,561 | 6/1931 | Germany. |

DONALL H. SYLVESTER, *Primary Examiner.*

CHARLES R. HODGES, *Examiner.*